US010286957B2

(12) United States Patent
He

(10) Patent No.: US 10,286,957 B2
(45) Date of Patent: May 14, 2019

(54) INVISIBLE FRAME FOR AUTOMOBILE WINDSHIELD AND SIDE WINDOWS

(71) Applicant: Yizong He, Forest Lake, MN (US)

(72) Inventor: Yizong He, Forest Lake, MN (US)

( * ) Notice: Subject to any disclaimer, the term of this patent is extended or adjusted under 35 U.S.C. 154(b) by 0 days.

(21) Appl. No.: 15/938,929

(22) Filed: Mar. 28, 2018

(65) Prior Publication Data
US 2018/0281867 A1 Oct. 4, 2018

Related U.S. Application Data

(63) Continuation-in-part of application No. 15/914,906, filed on Mar. 7, 2018.

(30) Foreign Application Priority Data

Mar. 25, 2017 (CN) ............ 2017 2 0298025 U

(51) Int. Cl.
B62D 25/04 (2006.01)
G02B 17/02 (2006.01)
G02B 5/04 (2006.01)

(52) U.S. Cl.
CPC .......... B62D 25/04 (2013.01); G02B 17/023 (2013.01); G02B 5/04 (2013.01); G02B 5/045 (2013.01)

(58) Field of Classification Search
CPC .......... B62D 25/04; B62D 29/04; G02B 5/04; G02B 1/00; G02B 17/00; G02B 27/00; G02B 27/09; B60R 1/10; B60R 1/00
See application file for complete search history.

(56) References Cited

U.S. PATENT DOCUMENTS

| 5,751,482 A | 5/1998 | Challener, IV |
| 2005/0099815 A1 | 5/2005 | Kim et al. |
| 2009/0323192 A1 | 12/2009 | Towndrow et al. |

(Continued)

FOREIGN PATENT DOCUMENTS

CN 103912186 A 7/2014

OTHER PUBLICATIONS

"Invisibility", Wikipedia, https://en.wikipedia.org/wiki/Invisibility, 3 pages, printed from the Internet on May 16, 2018.

(Continued)

Primary Examiner — Cara E Rakowski
Assistant Examiner — Danell L Owens
(74) Attorney, Agent, or Firm — Chen Yoshimura LLP

(57) ABSTRACT

Frames for an automobile windshield and side windows with improved visibility is formed by a plurality of hollow quadrilateral prisms. Each hollow quadrilateral prism includes four rigid right triangular prisms laid unsymmetrically in a V-like shape, two on each side of the V. Each rigid right triangular prism has a base triangle which is an obtuse and scalene triangle, and front and rear lateral faces which are covered with a reflective material of visible light. The front and rear lateral faces of the four right triangular prisms face each other forming an unsymmetrical channel between them, which is filled with a transparent material. The hollow quadrilateral prism reflects incident light in sequence by the reflective lateral faces of right triangular prisms. Many hollow invisible quadrilateral prisms are stacked up to form pillars for an automobile.

7 Claims, 6 Drawing Sheets

101: a car; 102: A-pillar; 103: B-pillar;
104: C-pillar; 105: D-pillar; 106: the roof of a car.

(56) References Cited

U.S. PATENT DOCUMENTS

2015/0248013 A1* 9/2015 Chen .................. H01Q 15/08
359/625
2017/0010451 A1* 1/2017 Naya .................. G02B 5/04
2018/0164079 A1* 6/2018 Banerjee .................. F41H 3/00

OTHER PUBLICATIONS

"How to make an invisibility Cloaking device using mirrors", Devon Cummings, Addictootech, Aug. 18, 2013, http://www.addictootech.com/invisibility-cloaking-device/, 5 pages, printed from the Internet on May 16, 2018.

* cited by examiner

101: a car; 102: A-pillar; 103: B-pillar;
104: C-pillar; 105: D-pillar; 106: the roof of a car.

Terminologies of a right triangular prism
201 upper base triangle;   202 lower base triangle;
203 front lateral face;    204 rear lateral face;
205 bottom floor;          206, 207, 208 lateral edge;
Altitude of a triangular prism equals to length of lateral edge 206, 207, 208.

301, 302, 303, 304: rigid triangular prisms, solid or hollow;
305, 306, 309, 310: rear lateral faces;
307, 208, 311, 312: front lateral faces;
A, B, C, D, E, E', F, G, H, I, J: vertices on the same plane.

601: observer's point; 602: pillar of an automobile;
603, 604, 605, 606: hollow quadrilateral prisms of invisibility.

INVISIBLE FRAME FOR AUTOMOBILE WINDSHIELD AND SIDE WINDOWS

BACKGROUND OF THE INVENTION

Field of the Invention

This invention relates to camouflaging various pillars framing the windshield and side windows of an automobile.

Description of Related Art

Made of transparent fragile glass, the windshield and side windows of automobiles cannot offer as much protection to both driver and passengers as steel materials. Nevertheless, the transparent material is necessary so that drivers can see their surroundings clearly. Almost all automobiles need frames supporting the windshield and side windows. All conventional pillars framing the windshield and side windows are solid chunky posts. Consequently, drivers need to adjust their position to look around such pillars in order to see what is front of the automobile. As shown in FIG. 1, there is no doubt that A, B, C and D pillars, labeled 102, 103, 104 and 105, according to conventional automobile design occupy a considerable area, inevitably blocking the view of drivers and causing blind spots.

Jaguar Land Rover removed blind spots caused by chunky structural pillars and used head-up display projectors to beam a picture of the roadscape onto windscreen pillars to make up for any obscured views, turning all the pillars into video screens, including the B- and C-pillars in the back. Each one takes a live video stream from a series of cameras, beaming up footage of vehicles, pedestrians and other objects outside the car for a 360-degree panorama view. Other similar technologies to make the A-pillars invisible are also reported. These designs do not influence the structure of the pillars and thus the mechanical strength can be maintained. However, the frame still remains partly visible and the color of the projected images is not completely natural. As early as 2001, the Volvo car company proposed the Safety Concept Car (SCC) and hollowed out the A-pillar. Obviously such a lattice-like pillar enlarges the view of the driver considerably and makes the car safer to drive. Similar technologies were also developed by other designers.

Different from all above, another design made the pillar triangular and shrunk the size of A-pillars, using steel of super strength. This elegant and solid pillar can reduce the area of the blind spot effectively.

Audi AR boldly and originally removed the A-pillar completely, supporting the windshield only by the roof. The visual field increases perfectly and driving becomes much safer because the blind spots caused by the two A-pillars disappear without trace. Nevertheless, some question the security of the car, doubting that in an accident or roll-over, the roof can hold without the A-pillar.

SUMMARY

Accordingly, the present invention is directed to a frame for an automobile windshield and side windows with improved visibility that substantially obviates one or more of the problems due to limitations and disadvantages of the related art.

Embodiments of the present invention provide a prism group, referred to as a "hollow quadrilateral prism of invisibility" or "hollow quadrilateral prism" in this disclosure, which is formed by four rigid right triangular prisms of an either solid or hollow material, laid unsymmetrically in a V-like shape serving as support for the windshield and side windows used in automobiles. The prominent advantage of the support structure is that the pillar appears to be almost invisible so that the blind spots caused by A, B, C and D pillars will be diminished to a large extent. Therefore, the driver's view is considerably enlarged.

The pillar structure reflects incident light, in sequence by the lateral faces of mirrors of right triangular prisms. Many hollow invisible quadrilateral prisms are stacked up to form pillars for an automobile replacing the traditional ones. Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a hollow quadrilateral prism, which includes:

first, second, third and fourth rigid right triangular prisms, each right triangular prism having an upper and a lower base having identical height of an obtuse and scalene triangle, each right triangular prism having a rectangular front lateral face, a rectangular rear lateral face and a rectangular bottom floor, located between and perpendicular to the upper and lower bases, the obtuse triangles of the upper and lower bases flare to the bottom floor, wherein the rectangular front lateral face and the rectangular rear lateral face of each right triangular prism is covered by a material that reflects visible light, wherein the lower base triangles of the first to fourth right triangular prisms are on a same first plane and the upper base triangles of the four prisms are on a same second plane, which is parallel to the first plane, wherein the bottom floors of the first and third right triangular prisms are on a same third plane, and the front lateral face of the first right triangular prism and the rear lateral face of the third right triangular prism are separated with a rectangular gap, wherein the bottom floors of the second and fourth right triangular prisms are on the same fourth plane and immediately adjacent to each other, and the front lateral face of the second right triangular prism and the rear lateral face of the fourth right triangular prism are adjacent to each other, wherein the lateral edges of first and second right triangular prisms, opposite each bottom floor are on a same fifth plane, wherein the lateral edges of third and fourth right triangular prisms, opposite each bottom floor are on a same sixth plane, parallel to the fifth plane, wherein the plane perpendicular to the fifth plane and passes through an intersection line of the third and fourth planes is defined as a seventh plane on which the observer's point (also called the the bottom point of V-like shape) locates, wherein an acute dihedral angle formed by the third and seventh planes is named $\phi_1$, wherein the acute dihedral angle formed by the fourth and seventh is named $\phi_2$, larger than $\phi_1$, wherein a height of the upper or lower base triangle of the right triangular prism is defined by a perpendicular distance from the bottom floor of the right triangular prism to opposite lateral edge, and wherein heights of the upper and lower base triangles of all the four right triangular prisms are identical, and wherein the heights of all the four right triangular prisms, defined by the length of lateral edge of the right triangular prism, are identical.

Parameters of the of the first to fourth triangular prisms defined in the first plane satisfy a set of equations described in more detail later.

Preferably, a space between the first, second, third and fourth right triangular prisms is filled with a transparent material. In some embodiments, the transparent material is air.

Preferably, each of the four right triangular prisms has an either solid or hollow interior. In another aspect, the present invention provides support pillars, which includes a plurality of the above hollow quadrilateral prisms stacked up.

It is to be understood that both the foregoing general description and the following detailed description are exemplary and explanatory and are intended to provide further explanation of the invention as claimed.

DETAILED DESCRIPTION OF PREFERRED EMBODIMENTS

A hollow quadrilateral prism designed to serve as an almost invisible frame for an automobile employs four right triangular prisms, rigid material laid unsymmetrically. It is configured to make a good portion of the frame invisible to the driver of an automobile and renders the driving safer and more comfortable.

Such a pillar can camouflage itself, without depending on any outer refractive materials or reflectors. More precisely, it is an invisible hollow quadrilateral prism comprised of four right triangular prisms with mirror lateral faces. Such quadrilateral prisms line up to form one or two pillars replacing the traditional solid chunky pillars that support the windshield and side windows, so that the area of the blind spot will be reduced to some extent and provide the driver with a better view.

Figure 1:
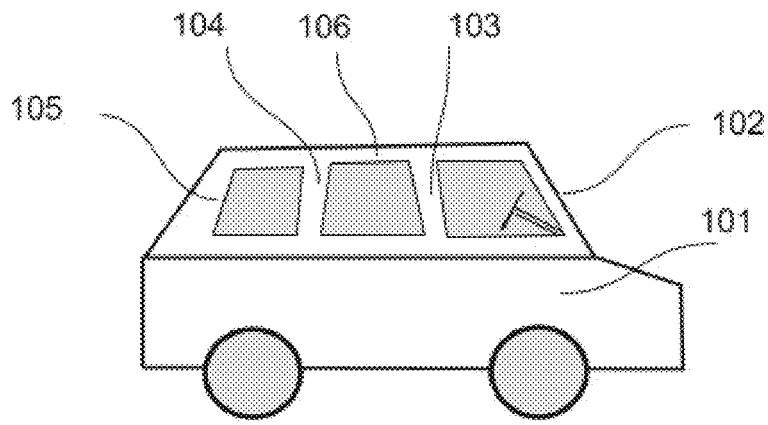
FIG. 1 illustrates pillars A, B. C and D of an automobile.

FIG. 1 illustrates the definition of A, B, C and D-pillar of an automobile as well as the roof supported by all the pillars.

It is well known that when visible light, emitted or reflected by a given object, enters a human's eyes, the object is seen. Based on this fact, in order to make some object invisible, it is necessary to bend the light from the object to avoid entering the observer's eyes. A common way to curl light is through the use of refractive materials or reflection mirrors. Therefore, the core problem of stealth is how to bend light efficiently.

A quadrilateral prism of invisibility introduced herein bends two beams of parallel incident rays by eight lateral faces of mirrors laid on four right triangular prisms.

In order to make the description easier to understand, first of all, some relevant terminologies for a right triangular prism, the component used to construct a hollow quadrilateral prism of invisibility, are introduced below.

Figure 2:
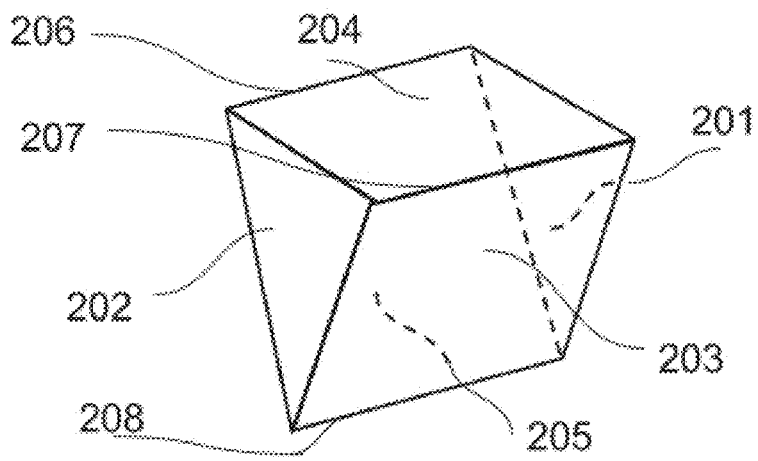
FIG. 2 illustrates the definition of a right triangular prism with terminologies for descripting other figures concerned.

FIG. 2 illustrates the definition of a triangular prism. A triangular prism is defined as a three-sided prism; it is a polyhedron made of a triangular lower base face, a translated copy as the upper base face, and three faces joining corresponding sides. A right triangular prism has rectangular sides. All cross-sections parallel to the base faces are the same triangle. Some terminologies of a right triangular prism are defined as following, with reference to FIG. 2: define 201 as the upper base triangle, which is obtuse and scalene; define 202 as the lower base triangle, which is obtuse and scalene and identical to the upper base triangle; define 203 as the front lateral face, covered by a reflective material of visible light; define 204 as the rear lateral face, covered by a reflective material of visible light; define 205 as the bottom floor of a rectangle; and define 206, 207 and 208 as the altitudes of the triangular prism, which are three parallel lateral edges being the same length.

The definition of a quadrilateral prism is a solid (3-D) object with two quadrilateral faces at either end and four rectangular faces joining these. The hollow quadrilateral prism of invisibility is comprised of four right triangular prisms arranged as shown in FIG. 3.

Figure 3:
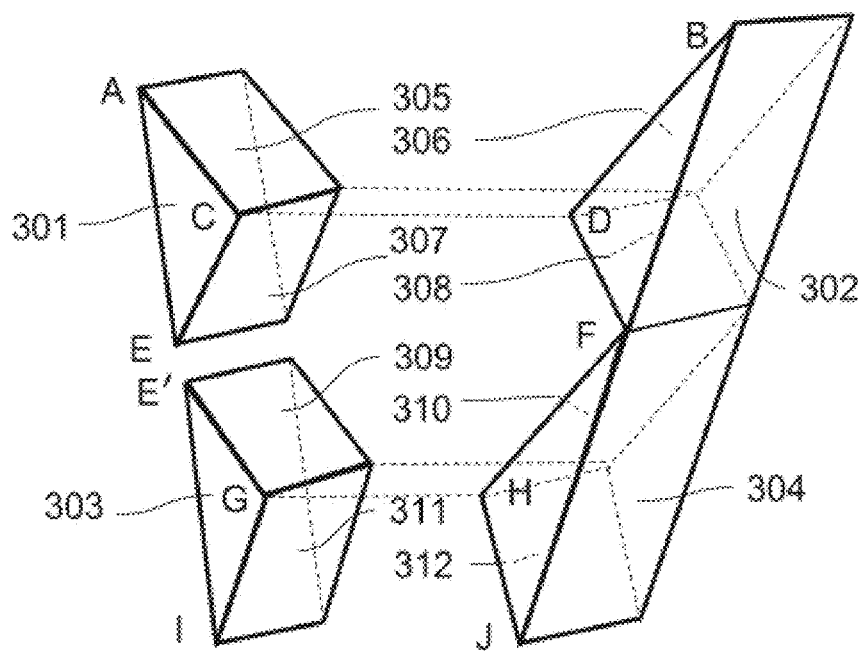
FIG. 3 illustrates the structure of the hollow quadrilateral prism of invisibility serving as a new windshield frame for an automobile.

FIG. 3 illustrates the heights of the upper and lower base triangles of the four right triangular prisms, as defined by the perpendicular distance from the bottom floor to the lateral edge opposite the bottom floor of each triangular prism, are all identical and denoted by h. (see FIG. 4). All altitudes of the four quadrilateral prisms are the same length; consequently, all the widths of the four bottom floors of the rectangles are identical.

The lower base triangles of the first to fourth right triangular prisms are on a same first plane and the upper base triangles of the four prisms are on a same second plane which is parallel to the first plane; the bottom floors of the first (301) and third (303) right triangular prisms are on a same third plane; and the front lateral face of the first right triangular prism and the rear lateral face of the third right triangular prism are separated with a rectangular gap; the bottom floors of the second (302) and fourth (304) right triangular prisms are on the same fourth plane and immediately adjacent to each other, and the front lateral face of the second right triangular prism and the rear lateral face of the fourth right triangular prism are adjacent to each other. The third and fourth planes intersect at a line, and the location where this line intersects the plane of FIG. 4 is denoted as O.

Again in FIG. 3, the lateral edges of 301 and 302, flaring to each bottom floor is parallel and on the same fifth plane on which two vertices C and D locate. Similarly, the lateral edges of 303 and 304, flaring to each bottom floor is parallel and on the same sixth plane on which two vertices G and H locate. The the fifth plane is parallel to sixth plane, therefore, CD is parallel to GH.

Figure 4:
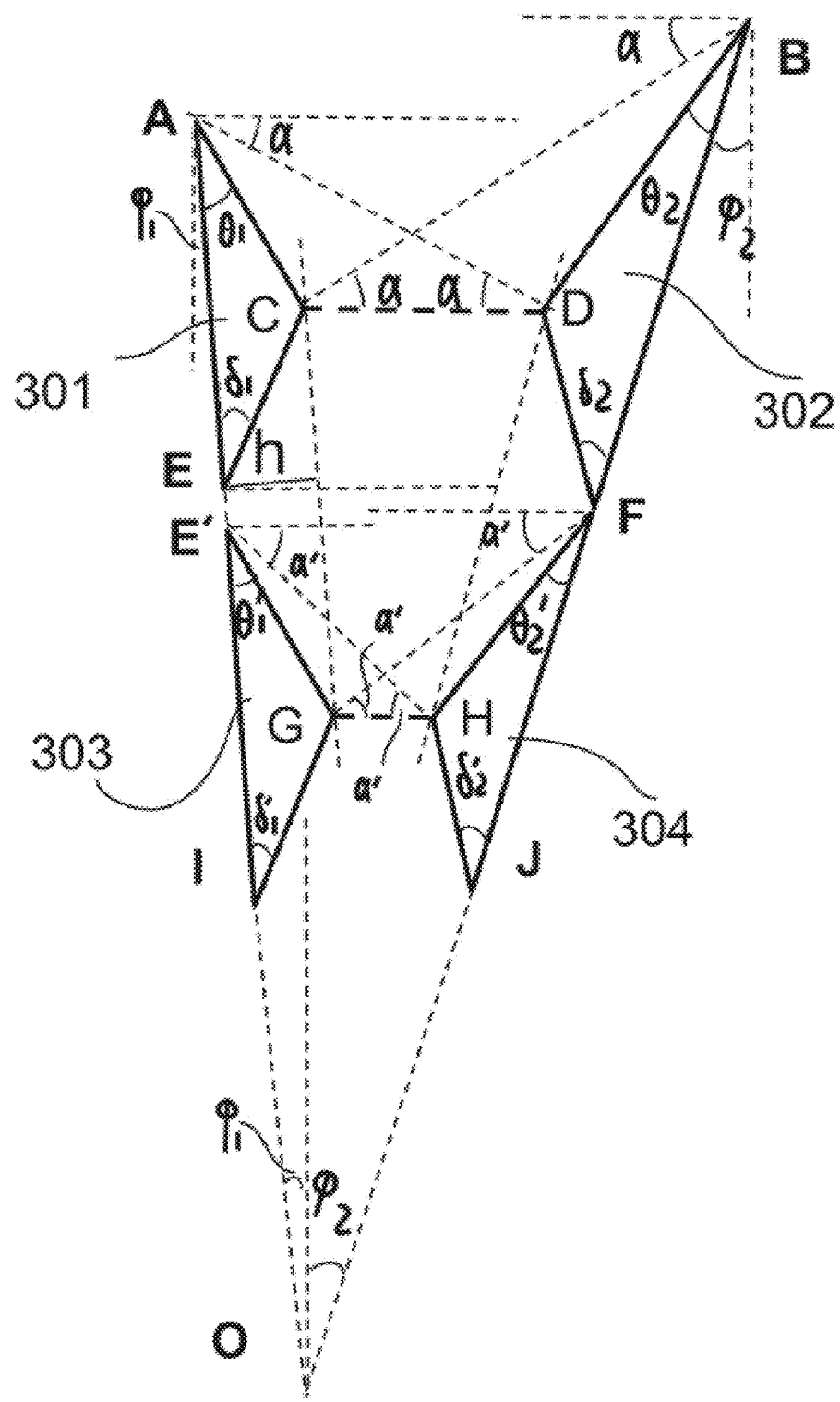
FIG. 4 illustrates a cross sectional view of the structure of FIG. 3 and the parameters determining the structure of the invisible hollow quadrilateral prism shown in FIG. 3.

The plane perpendicular to fifth plane (also to sixth) and passes through the intersection line of the third and fourth planes is defined as seventh plane on which the observer's point O (also called the bottom point of V-like shape) locates, where the acute dihedral angle formed by the third and seventh planes is named $\phi_1$, the acute dihedral angle formed by the fourth and seventh planes is named $\phi_2$, larger than $\phi_1$, FIG. 4 represents a cross-section parallel to all base triangles of the four right triangular prisms shown in FIG. 3, where $\theta_1$ is the dihedral angle of the third plane and rear lateral face of the first right triangular prism, $\delta_1$ is the dihedral angle of the third plane and front lateral face of the first right triangular prism, where $\theta_2$ is the dihedral angle of the fourth plane and rear lateral face of the second right triangular prism, $\delta_2$ is the dihedral angle of the fourth plane and front lateral face of the second right triangular prism, where $\theta'_1$ is the dihedral angle of the third plane and rear lateral face of the third right triangular prism, $\delta'_1$ is the dihedral angle of the third plane and front lateral face of the third right triangular prism, where $\theta'_2$ is the dihedral angle of the fourth plane and rear lateral face of the fourth right triangular prism, $\delta'_2$ is the dihedral angle of the fourth plane and front lateral face of the fourth right triangular prism, $\alpha$ is the dihedral angle formed by the fifth plane CD and the plane determined by the lateral edge E' opposite the front lateral face of the first right triangular prism and the lateral edge D opposite the bottom floor of the second right triangular prism, $\angle BCD = \angle ADC = \alpha$, $\alpha'$ is the dihedral angle formed by the sixth plane GH and the plane determined by the lateral edge E' opposite the front lateral face of the third right triangular prism and the lateral edge H opposite the bottom floor of the fourth right triangular prism, $\angle FGH = \angle E'HG = \alpha'$. h is the height of all the eight base triangles of triangular prisms. All the parameters defined above must satisfy the ten equations below:

$$\phi_1 + 2\theta_1 + \alpha = \frac{\pi}{2} \quad \text{Eq. (1)}$$

$$\phi_2 + 2\theta_2 + \alpha = \frac{\pi}{2} \quad \text{Eq. (2)}$$

$$\theta_1 + \delta_1 + \alpha = \frac{\pi}{2} \quad \text{Eq. (3)}$$

$$\theta_2 + \delta_2 + \alpha = \frac{\pi}{2} \quad \text{Eq. (4)}$$

$$\theta'_1 + \delta_1 + \frac{\alpha + \alpha'}{2} = \frac{\pi}{2} \quad \text{Eq. (5)}$$

$$\theta'_2 + \delta_2 + \frac{\alpha + \alpha'}{2} = \frac{\pi}{2} \quad \text{Eq. (6)}$$

$$\theta'_1 + \delta'_1 + \alpha' = \frac{\pi}{2} \quad \text{Eq. (7)}$$

$$\theta'_2 + \delta'_2 + \alpha' = \frac{\pi}{2} \quad \text{Eq. (8)}$$

$$h \csc \alpha = CD \quad \text{Eq. (9)}$$

$$h \csc \alpha' = GH \quad \text{Eq. (10)}$$

For a concrete problem, $\phi_1$, $\phi_2$ CD, GH and h are all known, and all others ten unknowns $\theta_1$, $\theta_2$, $\delta_2$, $\theta'_1$, $\theta'_2$, $\delta'_1$, $\delta'_2$, $\alpha$, $\alpha'$ can be obtained from above ten equations definitely. Therefore the system which consists of four right triangle prisms can be determined uniquely.

Figure 5:
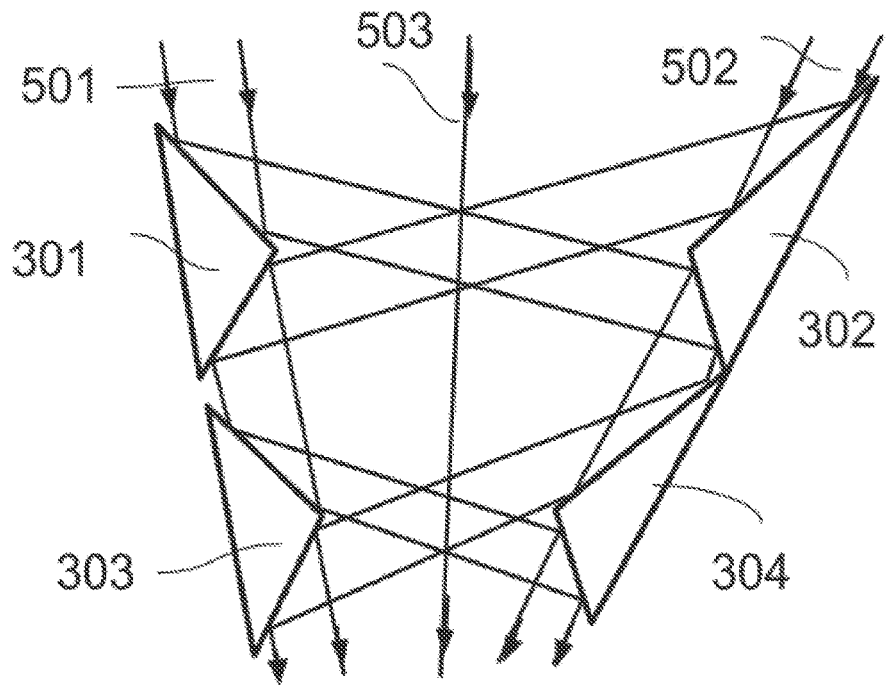
FIG. 5 illustrates the light paths going through the hollow quadrilateral prism to produce the camouflaged effect.

FIG. 5 shows the four prisms as in FIG. 3 and illustrates the light paths demonstrating the principle of stealth technology. The incident light 501, parallel to the bottom floors of both prism 301 (cross section line AE in FIG. 4) and prism 303 (cross section line E'I in FIG. 4), is reflected, each in due succession by the plane mirrors 305, 308, 310 and 311 in FIG. 3. Because of the above-described parameter relationships, the reflected light from the plane mirror 305 is parallel to the line AD shown in FIG. 4, the reflected light from the plane mirror 308 is parallel to the line DH, the reflected light from the plane mirror 310 is parallel to the line HI, and the reflected light from the plane mirror 311 is parallel to the line E'I which is the direction of the original incident light 501. Finally, light exits from the right triangular prism system parallel and overlapping in the direction of the incident ray 501.

Similarly, the incident light 502, parallel to bottom floors both prism 302 (cross section line BF in FIG. 4) and prism 304 (cross section line FJ in FIG. 4), is reflected, each in due succession by the plane mirrors 306, 307, 309 and 312 in FIG. 3. Finally, light exits from the right triangular prism system in the direction of the initial incident ray 502 in a parallel and overlapping way. The incident light 503 moving through the channel of the hollow quadrilateral prism (i.e., the space between the two prisms 301 and 303 on one side and the two prisms 302 and 304 on the other side) goes out in rectilinear propagation without any blockage. The total effect is that all the four right triangular prism 301, 302, 303 and 304 inside are camouflaged. The channel of the hollow quadrilateral prism is filled fully with a transparent material, such as air or other solid or liquid transparent material, in the area formed between the four solid right triangular prisms. The interiors of the individual prisms 301-304 are preferably made of either the solid or hollow, strong material such as metal for structural support for the windshields and windows.

Figure 6:
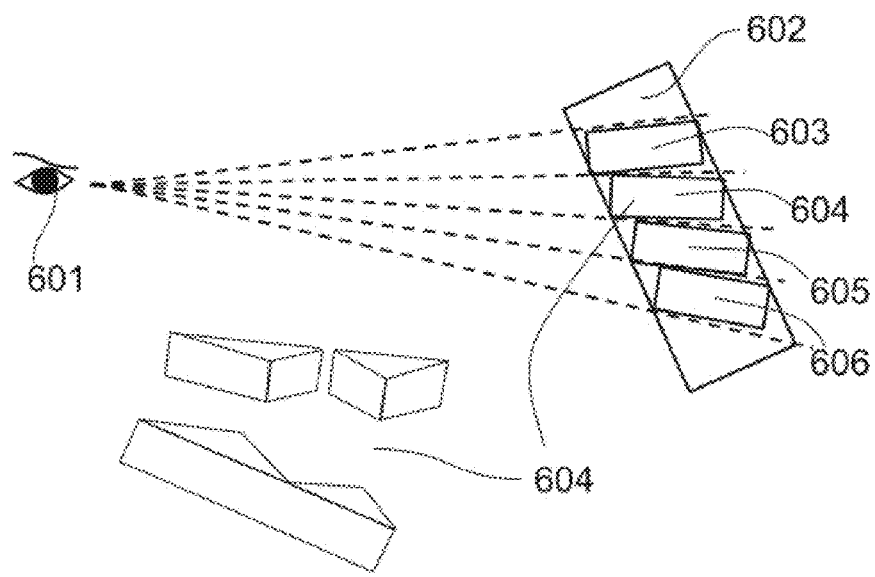
FIG. 6 illustrates an example of multiple hollow quadrilateral prisms aligned and stacked to form a pillar.

FIG. 6 illustrates the way that the hollow quadrilateral prisms of invisibility, 603, 604, 605 and 606, are aligned and stacked up to form a pillar 602 of an automobile. The sight lines from the observer's point 601 flare toward pillar 602 and each invisible quadrilateral prism lines up with the lateral edges parallel to the respective sight lines. The multiple hollow quadrilateral prisms 603, 604, 605 and 606 may be the same or different, but each of them has parameters that satisfy the conditions described above. The channel space within the quadrilateral prism is filled by transparent materials. Some of gaps formed by adjacent quadrilateral prisms are welded by steel to maintain the mechanical strength.

Figure 7:
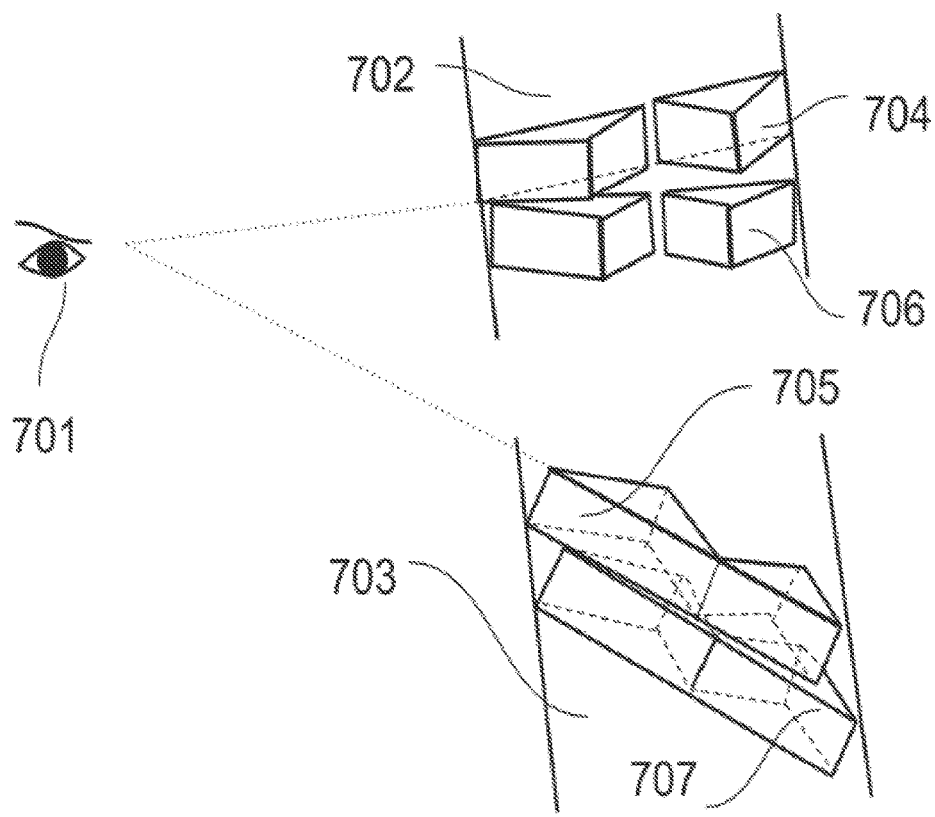
FIG. 7 illustrates another example of multiple quadrilateral prisms aligned and stacked to form two pillars.

FIG. 7 illustrates how to form two pillars 702 and 703 in same right triangular prism system. 704, 706 and other two triangular prisms on the same side heap up an invisible pillar and 705 and 707 for another pillar correspondingly. The total effect is both pillars 702 and 703 are camouflaged to the observer's point 701.

In addition to a frame for an automobile, the hollow quadrilateral prism described above may be used in other applications to construct an almost invisible structure.

Further, although the hollow quadrilateral prism described above is formed of four or two pairs of prisms, it may also be formed of four, eight, etc. pairs prisms arranged in the V shape unsymmetrically. It will be apparent to those skilled in the art that various modification and variations can be made in the pillar and window frame for automobiles of the present invention without departing from the spirit or scope of the invention. Thus, it is intended that the present invention cover modifications and variations that come within the scope of the appended claims and their equivalents.

What is claimed is:

1. A hollow quadrilateral prism, comprising:
first, second, third and fourth rigid right triangular prisms,
each right triangular prism having an upper and a lower base having identical height of an obtuse and scalene triangle,
each right triangular prism having a rectangular front lateral face, a rectangular rear lateral face and a rectangular bottom floor, located between and perpendicular to the upper and lower bases, the obtuse triangles of the upper and lower bases flare to the bottom floor,
wherein the rectangular front lateral face and the rectangular rear lateral face of each right triangular prism is covered by a material that reflects visible light,
wherein the lower base triangles of the first to fourth right triangular prisms are on a same first plane and the upper base triangles of the four prisms are on a same second plane, which is parallel to the first plane,
wherein the bottom floors of the first and third right triangular prisms are on a same third plane, and the front lateral face of the first right triangular prism and the rear lateral face of the third right triangular prism are separated with a rectangular gap,
wherein the bottom floors of the second and fourth right triangular prisms are on the same fourth plane and immediately adjacent to each other, and the front lateral face of the second right triangular prism and the rear lateral face of the fourth right triangular prism are adjacent to each other,
wherein the lateral edges of first and second right triangular prisms, opposite each bottom floor are on a same fifth plane,
wherein the lateral edges of third and fourth right triangular prisms, opposite each bottom floor are on a same sixth plane, parallel to the fifth plane,
wherein the plane perpendicular to the fifth plane and passes through an intersection line of the third and fourth planes is defined as a seventh plane on which the observer's point (also called the the bottom point of V-like shape) locates,
wherein an acute dihedral angle formed by the third and seventh planes is named $\phi_1$,
wherein the acute dihedral angle formed by the fourth and seventh is named $\phi_2$, larger than $\phi_1$,
wherein a height of the upper or lower base triangle of the right triangular prism is defined by a perpendicular distance from the bottom floor of the right triangular prism to opposite lateral edge, and wherein heights of the upper and lower base triangles of all the four right triangular prisms are identical, and
wherein the heights of all the four right triangular prisms, defined by the length of lateral edge of the right triangular prism, are identical.

2. The hollow quadrilateral prism of claim 1, wherein parameters of the first to fourth triangular prisms and the relative position of four right quadrilateral prism in the first plane satisfy:

$$\phi_1 + 2\theta_1 + \alpha = \frac{\pi}{2} \quad \text{Eq. (1)}$$

$$\phi_2 + 2\theta_2 + \alpha = \frac{\pi}{2} \quad \text{Eq. (2)}$$

$$\theta_1 + \delta_1 + \alpha = \frac{\pi}{2} \quad \text{Eq. (3)}$$

$$\theta_2 + \delta_2 + \alpha = \frac{\pi}{2} \quad \text{Eq. (4)}$$

$$\theta'_1 + \delta_1 + \frac{\alpha + \alpha'}{2} = \frac{\pi}{2} \quad \text{Eq. (5)}$$

$$\theta'_2 + \delta_2 + \frac{\alpha + \alpha'}{2} = \frac{\pi}{2} \quad \text{Eq. (6)}$$

$$\theta'_1 + \delta'_1 + \alpha' = \frac{\pi}{2} \quad \text{Eq. (7)}$$

$$\theta'_2 + \delta'_2 + \alpha' = \frac{\pi}{2} \quad \text{Eq. (8)}$$

$$h \csc \alpha = CD \quad \text{Eq. (9)}$$

$$h \csc \alpha' = GH \quad \text{Eq. (10)}$$

where $\theta_1$ is the dihedral angle of the third plane and rear lateral face of the first right triangular prism, $\delta_1$ is the dihedral angle of the third plane and front lateral face of the first right triangular prism,
where $\theta_2$ is the dihedral angle of the fourth plane and rear lateral face of the second right triangular prism, $\delta_2$ is the dihedral angle of the fourth plane and front lateral face of the second right triangular prism,
where $\theta'_1$ is the dihedral angle of the third plane and rear lateral face of the third right triangular prism, $\delta'_1$ is the dihedral angle of the third plane and front lateral face of the third right triangular prism,
where $\theta'_2$ is the dihedral angle of the fourth plane and rear lateral face of the fourth right triangular prism, $\delta'_2$ is the dihedral angle of the fourth plane and front lateral face of the fourth right triangular prism,
$\alpha$ is the dihedral angle formed by the fifth plane and the plane determined by the lateral edge opposite the front lateral face of the first right triangular prism and the lateral edge opposite the bottom floor of the second right triangular prism, $\angle BCD = \angle ADC = \alpha$,
$\alpha'$ is the dihedral angle formed by the sixth plane and the plane determined by the lateral edge opposite the front lateral face of the third right triangular prism and the lateral edge opposite the bottom floor of the fourth right triangular prism, $\angle FGH = \angle E'HG = \alpha'$.

3. The hollow quadrilateral prism of claim 1, wherein a space between the first, second, third and fourth right triangular prisms is filled with a transparent material.

4. The hollow quadrilateral prism of claim 3, wherein the transparent material is air.

5. The hollow quadrilateral prism of claim 1, wherein each of the first to fourth right triangular prisms has either a solid or hollow interior.

6. A support pillar, comprising a plurality of hollow quadrilateral prism of claim 5 stacked up.

7. Two support pillars, comprising a plurality of hollow quadrilateral prism of claim 5 stacked up, all the right triangular prisms on the left of the seventh plane serve as one pillar, all the right triangular prisms of the right of the seventh plane serve as another pillar.

* * * * *